US007043574B2

(12) United States Patent  
Saito

(10) Patent No.: US 7,043,574 B2  
(45) Date of Patent: May 9, 2006

(54) COMPUTER SYSTEM AND FRAME TRANSMITTING METHOD

(75) Inventor: Hisashi Saito, Yamanashi (JP)

(73) Assignee: NEC Corporation, Tokyo (JP)

( * ) Notice: Subject to any disclaimer, the term of this patent is extended or adjusted under 35 U.S.C. 154(b) by 154 days.

(21) Appl. No.: 10/639,481

(22) Filed: Aug. 13, 2003

(65) Prior Publication Data

US 2004/0034722 A1    Feb. 19, 2004

(30) Foreign Application Priority Data

Aug. 14, 2002 (JP) .............................. 2002-236345

(51) Int. Cl.
 *G06F 3/00* (2006.01)
(52) U.S. Cl. .................... 710/30; 710/20; 710/21; 710/33; 710/36
(58) Field of Classification Search ............... 710/20, 710/21, 30, 33, 36
See application file for complete search history.

(56) References Cited

U.S. PATENT DOCUMENTS

| 6,345,317 B1* | 2/2002 | Takeda ........................... 710/2 |
| 6,393,506 B1* | 5/2002 | Kenny ........................ 710/113 |
| 6,434,656 B1* | 8/2002 | Downer et al. ............. 710/316 |

FOREIGN PATENT DOCUMENTS

| JP | 56-149135 A | 11/1981 |
| JP | 61-224640 A | 10/1986 |
| JP | 3-42940 A | 2/1991 |
| JP | 6-14056 A | 1/1994 |
| JP | 7-193615 A | 7/1995 |
| JP | 7-336357 A | 12/1995 |
| JP | 8-186597 A | 7/1996 |
| JP | 11-119802 A | 4/1999 |
| JP | 2000-22752 A | 1/2000 |
| JP | 2001-69171 A | 3/2001 |
| JP | 3169861 B2 | 3/2001 |
| JP | 2002-524920 A | 8/2002 |

* cited by examiner

*Primary Examiner*—William M. Treat
*Assistant Examiner*—Mohammad O. Farooq
(74) *Attorney, Agent, or Firm*—Sughrue Mion, PLLC

(57) ABSTRACT

A computer system has a central processing unit, an input/output unit and two network units. The central processing unit is connected to the input/output unit via two network units. The central processing unit sends a frame, included in data, to the input/output unit via one network unit and simultaneously sends the same frame to the input/output unit via the other network unit. The input/output unit receives the same frames via both network unit. The input/output unit sends either of the same frames, whichever is received faster than the other, to the internal circuits.

10 Claims, 13 Drawing Sheets

COMPUTER SYSTEM AND FRAME TRANSMITTING METHOD

BACKGROUND OF THE INVENTION

1. Field of the Invention

The present invention relates to a computer system and a frame transmitting method which is adopted thereto.

2. Description of the Related Art

Some computer systems are equipped with a pair of a central processing unit and an input/output unit which are connected via two data transmitting routes. This kind of the computer systems are disclosed in, for example, Unexamined Japanese Patent Application KOKAI Publication No. H11-119802 and Japanese Patent No. 3169861. The disclosures of the above-indicated documents are incorporated herein by reference.

In general, this kind of the computer systems use one of the data transmitting route for transmitting frames included in data, and the other data transmitting route as a "back-up". In a case where a failure occurs on one of the data transmitting route while transmitting frames, the computer systems continues transmitting frames using the back-up (the other of the data transmitting route). That is, the computer systems switch the data transmitting routes when a fault occurs.

The computer system disclosed in Unexamined Japanese Patent Application KOKAI Publication No. H11-119802 switches two of data transmitting routes in accordance with a control of an OS (Operating System), a software, etc. In this computer system, if the data transmitting routes are switched while instructions which are not necessary responses are transmitted to the input/output unit, the OS can not specify which instructions have been sent to the input/output unit among all in some case. In this case, the OS may not be able to specify which instructions are to be re-transmitted, and this results in "system-down". Therefore, there is some room for improvement in reliability.

The computer system disclosed in Japanese Patent No. 3169861 once suspends transmitting frames when switching two of data transmitting routes. Transmitting frames is held until the switching is completed. Thus, transmitting frames is not carried out continuously, and there is some room for improving efficiency of frame transmission.

SUMMARY OF THE INVENTION

The present invention was made in view of the above circumstances, and an object of the present invention is to provide a computer system and a frame transmitting method adopted thereto to transmit frames effectively.

It is another object of the invention to provide a computer system and a frame transmitting method having good reliabilities.

To achieve the objects, a computer system according to a first aspect of the present invention, is a system comprising at least a pair of a processor and an input/output unit connected each other via two of data transmitting routes, wherein: the processor or the input/output unit sends a frame which are included in data to the input/output unit or the processor via one of the data transmitting routes and simultaneously sends the frame via the other of the data transmitting routes to the input/output unit or the processor; and the input/output unit or said processor receives the same frames via one of the data transmitting routes and the other of the data transmitting routes, and accepts either of the same frames based on the receiving order thereof.

The input/output unit or the processor may accept the one of the same frames which is received by the input/output unit or the processor faster than the other of the same frames, and may accept either one of the same frames received in a case where one of the same frames and the other of the same frames are received by the input/output unit or the processor at the same time.

Each of the processor and each of the input/output units may comprise a receiver for receiving the same frames via one of the data transmitting routes and the other of the data transmitting routes, and a counter which is incremented in a case where the receiver receives one of the same frames via one of the data transmitting routes and decremented in a case where the receiver receives the other of the same frames via the other of said data transmitting routes; wherein: the counter is only incremented or decremented thus overflowed to positive or negative because a failure occurs on either of the data transmitting routes and the receiver receives only either of the same frames via either of the data transmitting routes; and the receiver is capable of specifying the data transmitting route having a failure by detecting that the counter overflows to positive or negative.

The processor may further comprise a first multi-casting circuit for sending the same frames to the receiver included in said input/output unit and a first switching controller which is connected to a system-monitoring unit, operated by an administrator, and notified that a failure exits on either of the data transmitting routes from the receiver, wherein the first switching controller instructs the first multi-casting circuit to carry out frame transmission only via the data transmitting route which does not have a failure.

The input/output unit further comprising a second multi-casting circuit for sending the same frames to the receiver included in the processor, and a second switching controller for notifying to the system-monitoring unit that a failure exists on either of the data transmitting routes, in case of receiving a notification of the failure from the receiver included in the input/output unit, by transmitting the notification to the receiver included in the processor.

The first multi-casting circuit may notify the instruction, which is sent from the first switching controller, to the receiver included in the input/output unit via the data transmitting route not having the failure; the receiver included in the input/output unit transmits the instruction to the second switching controller; the second switching controller instructs the second multi-casting circuit to carry out frame transmission only via the data transmitting route not having the failure; and the second multi-cast circuit carries out frame transmission in accordance with the instruction from the second switching controller.

In a case where the failure is removed and the administrator gives an instruction from the system-monitoring unit to execute frame transmission using two of the data transmitting routes, the first switching controller may receive the instruction from the system-monitoring unit and transmit the received instruction to the first multi-casting circuit; the first multi-casting circuit may send the transmitted instruction to the receiver included in the input/output unit; the receiver included in the input/output unit may receive the instruction from the first multi-casting unit and notify the received instruction to the second switching controller; and the second switching controller may give an instruction to the second multi-casting circuit based on the instruction which is notified from the receiver included in the input/output unit.

To achieve the objects, a frame transmitting method according to a second aspect of the present invention, is applied to a computer system comprising at least a pair of a processor and an input/output unit connected each other via two of data transmitting routes, the method comprises: sending a frame which are included in data from the processor or the input/output unit to the input/output unit or the processor via one of the data transmitting routes and simultaneously sending the frame via the other of the data transmitting routes from the processor or the input/output unit to the input/output unit or said processor; receiving two of the same frames via one of the data transmitting routes and the other of the data transmitting routes by the input/output unit or the processor; and accepting either of the same frames based on the receiving order thereof.

The frame transmitting method may further comprise: accepting either of the same frames which is received by the input/output unit or the processor faster than the other of the same frames; accepting one of the same frame which is received via one of the data transmitting routes, among the same frames in a case where one of the same frames and the other of the same frames are received by the input/output unit or the processor at the same timing.

The frame transmitting method may further comprises: applying a counter to each of the processor and the input/output unit which is incremented in a case where the processor or the input/output unit receives one of the same frames via one of the data transmitting routes and decremented in a case where the processor or the input/output unit receives the other of the same frames via the other of the data transmitting routes; and specifying a failure occurring on either of the data transmitting routes by detecting that the counter overflows in a case where the failure occurs on either of the data transmitting routes thus the processor or the input/output unit only receives either of the same frames via the data transmitting route not having a failure.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

A computer system and a data transmitting method according to an embodiment of the present invention will now be explained with reference to FIG. 1 to FIG. 13.

Figure 1:
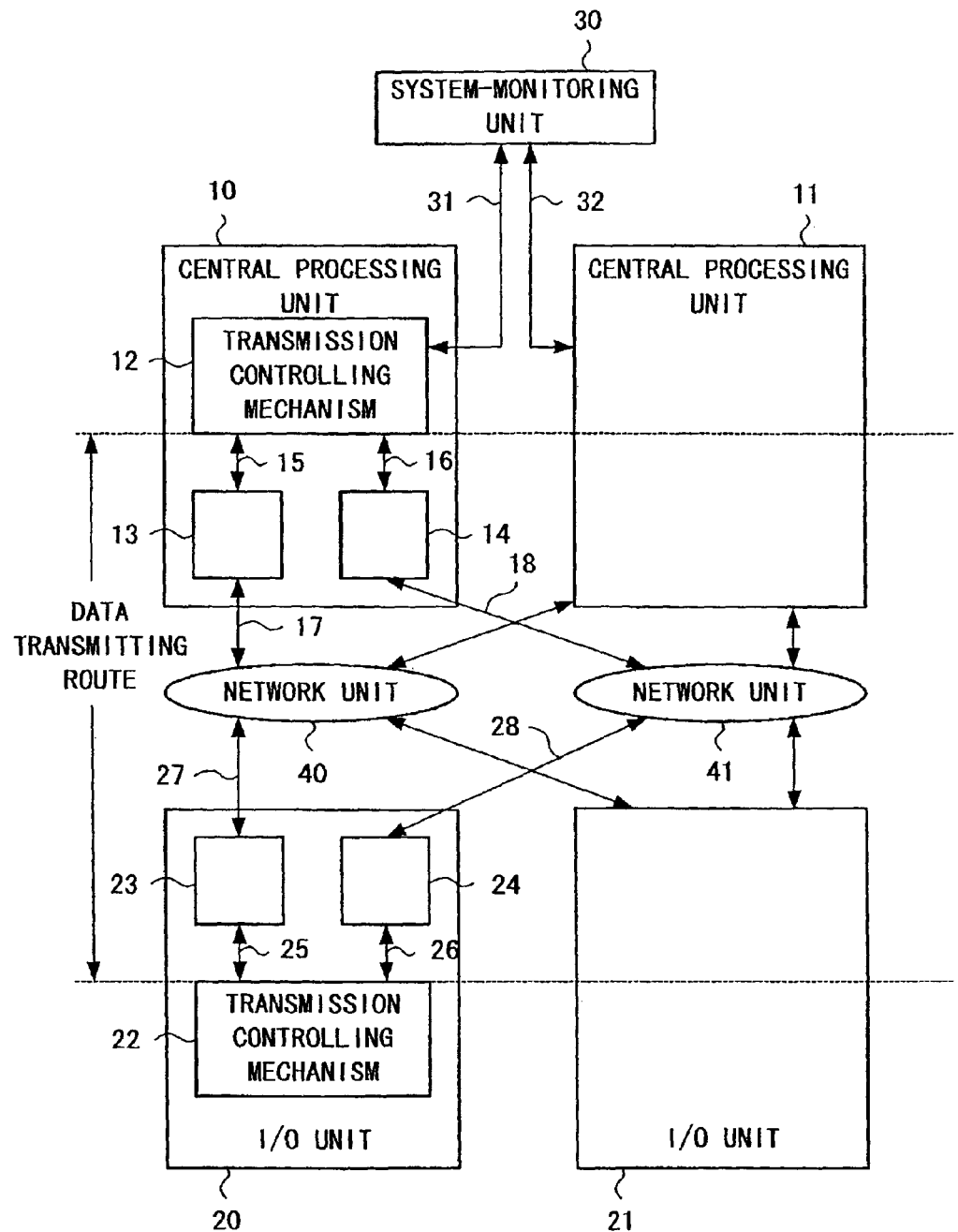
FIG. 1 is a block diagram showing a structure of a computer system according to an embodiment of the present invention.

As shown in FIG. 1, a computer system 1 comprises central processing units 10,11, input/output (hereinafter, I/O) units 20,21, a system monitoring unit 30 and network units 40,41.

First of all, the structure of the system-monitoring unit 30 will be explained. The system-monitoring unit 30 includes a display device such as a monitor, and an input device such as a keyboard. An administrator of the system-monitoring unit 30 inputs, for example, the following instructions using the system-monitoring unit 30:

1) Execution of frame transmission via two of the network units 40, 41; and 2) Execution of frame transmission via either of the network units.

In case of where the system-monitoring unit 30 receives a notification from the other components of the computer system 1 that either of the network units has a failure, the system-monitoring unit 30 instructs the other components of the computer system 1 to execute frame transmission via either of the network units which has not had a failure.

Next, the structure of the central processing units 10,11 will be explained. Since the structure of the central processing unit 10 is the same as that of the central processing unit 11, only the structure of the central processing unit 10 will be explained below. As illustrated, the central processing unit 10 comprises a transmission controlling mechanism 12 and interface controlling mechanisms 13, 14.

Figure 2:
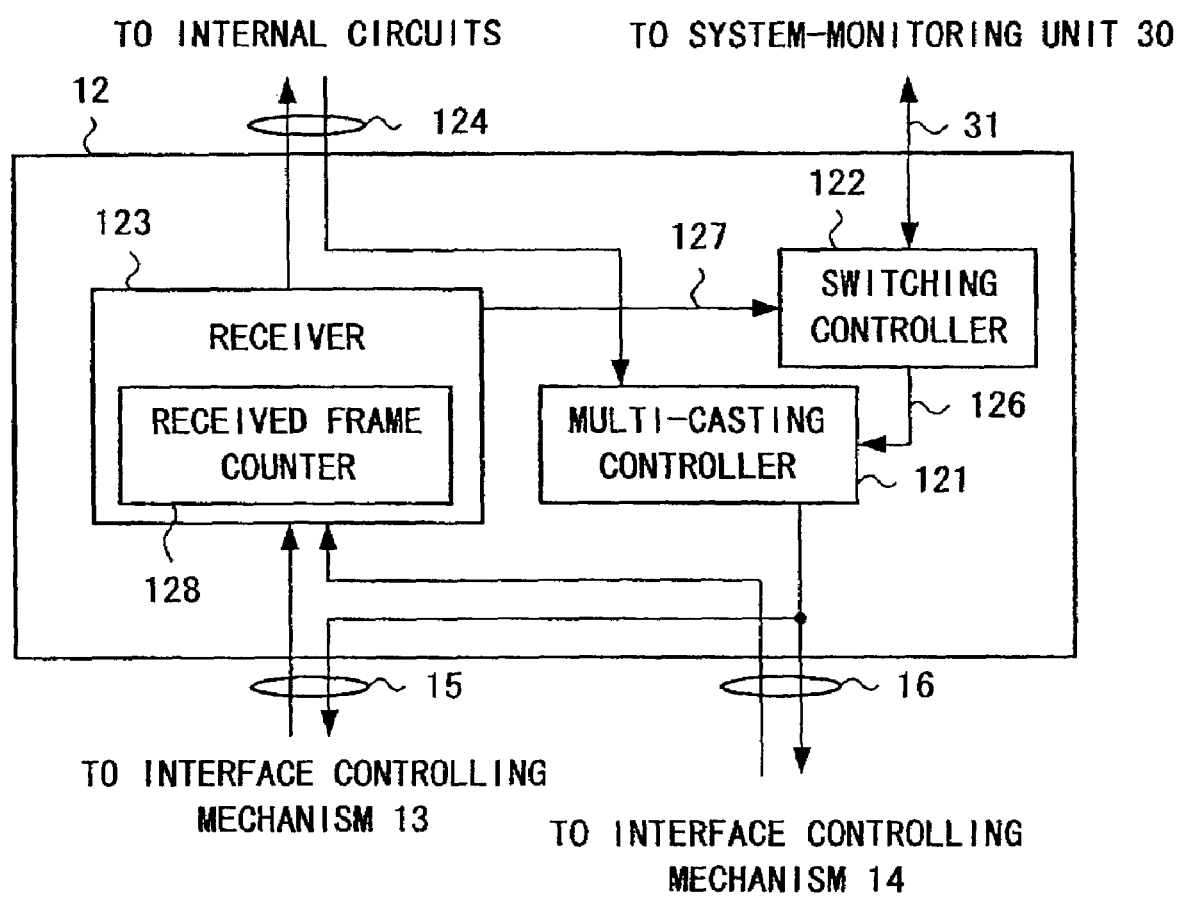
FIG. 2 is a block diagram showing a structure of a transmission controlling mechanism included in a central processing unit shown in FIG. 1.

An example of the structure of the transmission controlling mechanism 12 is shown in FIG. 2. As illustrated, the transmission controlling mechanism 12 comprises a multi-casting circuit (controller) 121, a switching controller 122 and a receiver 123.

The multi-casting circuit 121 is connected to an internal circuits such as an operation processing unit and a sequential controlling unit (both are not shown) via a channel 124. The multi-casting circuit 121 receives packets from the internal circuits via the channel 124 in frame. Hereinafter, these packets are generally called as data packets.

The multi-casting circuit 121 sends data packets in frame to either the interface controller 13 or the interface controller 14 via either the channel 15 or the channel 16 respectively, in accordance with an instruction from the switching controller 122. Or, the multi-casting circuit 121 sends data packets simultaneously to both the interface controller 13 and the interface controller 14 via both the channel 15 and the channel 16 in frame, in accordance with an instruction from the switching controller 122.

Figure 3A:
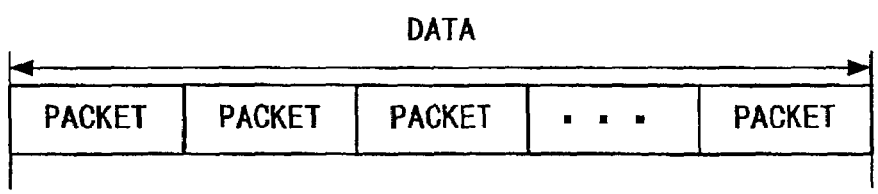
FIG. 3A is a diagram for explaining a structure of a data.
Figure 3B:
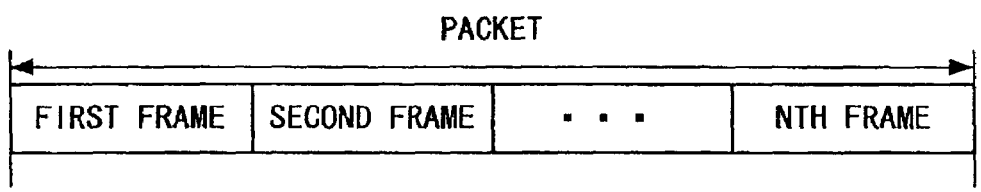
FIG. 3B is a diagram for explaining a structure of packet and FIG. 3C is a diagram for explaining a structure of a first frame shown in FIG. 3B.
Figure 3C:
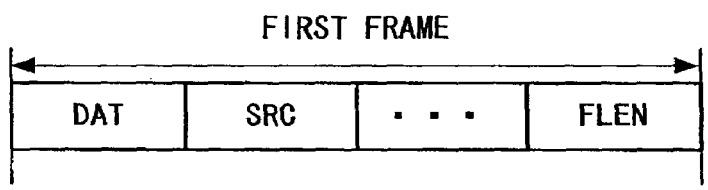

Here, data packets and a frame will be explained. A data packet and a frame are unit of frame transmission in the computer system 1 and fixed block of a data transmitted. As shown in FIG. 3A, a data includes a plurality of packets, and as shown in FIG. 3B, a packet includes n (n is an integer) of frames. The first frame of the n frames is a so-called header. As shown in FIG. 3C, a header includes a DAT field representing a destination address, a SRC field representing an address of a source where a packet is generated and a FLEN field representing, for example, a number of "n−1". For instance, in a case where a packet includes 3 frames, then the FLEN field represents "2". The FLEN field has enough "bit-width" to represent the number of "n−1".

The switching controller 122 shown in FIG. 2 is connected to the system-monitoring unit 30 via a system-monitoring path 31. The switching controller 122 notifies an instruction, which is notified from the system-monitoring unit 30, to the multi-casting circuit 121.

In case of receiving an instruction from the system-monitoring unit 30 for performing frame transmission with two of the network units 40, 41, the switching controller 122 generates a packet for notifying this instruction of the system-monitoring unit 30 to the components of I/O unit 20. The switching controller 122 sends the generated packet to the multi-casting circuit 121 via a control path 126. Hereinafter, this packet is generally called as first instruction packet.

In case of receiving an instruction from the system-monitoring unit 30 for performing frame transmission via either of the network units, the switching controller 122 also generates a packet for notifying this instruction of the system-monitoring unit 30 to the components of the I/O unit 20. The switching controller 122 sends the generated packet to the multi-casting circuit 121 via the control path 126. Hereinafter, this packet is generally called second instruction packet to distinguish from the first instruction packet.

The multi-casting circuit 121 may receive the first/second instruction packet while receiving data packets from the internal circuits. In this case, the multi-casting circuit 121 halts receiving data packets at "a break" of a data packet and a next packet, and sends the first/second instruction packet as an interruption process. After the completion of sending the first/second instruction packet, the multi-casting circuit 121 restarts transmitting data packets. The function for specifying the break of a data packet and a next packet will be explained later.

The switching controller 122 receives acknowledgement packets that are sent from the components of the I/O unit 20 and for notifying that the components of the I/O unit 20 receive the first/second instruction packet, from the receiver 123 via a notification path 127. By means of this, the switching controller 122 is notified that switching of a data transmitting route is completed. The switching controller 122 transmits this notification to the system-monitoring unit 30 via the system-monitoring path 31.

The switching controller 122 receives a notification that is sent from the components of the I/O unit 20 and for notifying a failure of either the network unit 40 or the network unit 41, via the receiver 123. The switching controller 122 transmits this notification to the system-monitoring unit 30 via the system-monitoring path 31.

The receiver 123 is connected to the interface controlling mechanism 13 and the interface controlling mechanism 14 via the channel 15 and the channel 16, respectively. The receiver 123 has a received-frame counter 128. The counter's value is primarily set a predetermined value, for example, "0" as an initial. The received-frame counter 128 is incremented by one when the receiver 123 receives a frame from the I/O unit 20 via the channel 15. On the other hand the received-frame counter 128 is decremented by one when the receiver 123 receives a frame from the I/O unit 20 via the channel 16. The received-frame counter 128 may be incremented when the receiver receives a frame via the channel 14, and count down when the receiver receives the other frame via the channel 13.

In a case where the computer system 1 performs frame transmission via both the network unit 40 and the network unit 41, the receiver 123 receives one data packets via the channel 15 and the other data packets having the same contents as one data packets transmitted via the channel 15 in frame. Due to the difference between the load condition of the network unit 40 and that of the network unit 41, a delay occurs thus one data packet sent via the network unit 40 is not transmitted to the receiver 123 at the same timing when the other data packets sent via the network unit 41 is transmitted to the receiver 123. Thus a frame via one of the network units is transmitted first, and the other frame having the same contents as the first transmitted frame is transmitted later via the other network units. Using the increment or decrement of the counter's value, the receiver 123 can specify which frame is among the same frames received first via either the channel 15 or the channel 16. The receiver 123 forwards a first-transmitted frame to the internal circuits via the channel 124, and deletes the other frame transmitted later since it is not necessary to send the frame, having the same contents as the first-transmitted frame, to the internal circuits in duplex.

There is a case that either the network unit 40 or the network unit 41 has a failure while the computer system 1 performing the frame transmission using both the network unit 40 and the network unit 41, and the transmission via the defective network unit is suspended. In this case, the counter's value overflows and turns to be a positive/negative value because the receiver 123 receives frames only via either of the network units.

For example, in a case where a failure occurs on the network unit 40, the received-frame counter 128 is only decremented because the receiver 123 receives frames only from the interface controlling mechanism 14 connected to the network unit 41. In this case, the counter's value turns to negative. On the other hand, in a case where a failure occurs on the network 41, the counter's value turns to be a positive value. The receiver 123 specifies that a failure occurs on either of the network units by detecting the overflow of the counter's value. When the counter's value overflows to a negative or positive value, the receiver 123 specifies which network unit has a failure, based on the overflowed counter's value, and notifies that a failure occurs on the specified network unit.

The receiver 123 also notifies a failure of the networks when receives an error notification packet, dummy frames or a failure notification packet. The operation of the receiver 123 in this case will be explained later.

The overflowed counter's value is initialized to the preset value when the receiver 123 receives the first/second instruction packets or the acknowledgement packet.

Figure 4A:
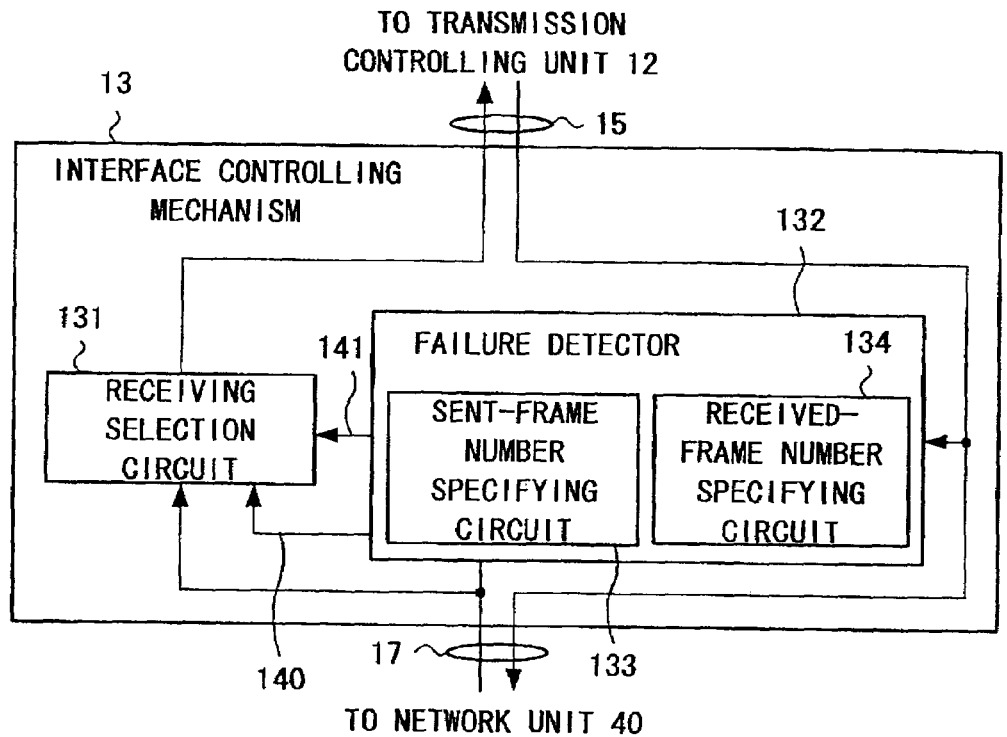
FIG. 4A is a block diagram showing a structure of an interface controlling mechanism included in the central processing unit shown in FIG. 1

The interface controlling mechanism 13 shown in FIG. 1 has the same structure as that of the interface controlling mechanism 14. The interface controlling mechanism 13 transmits data (data packets) in accordance with a predetermined protocol. As shown in FIG. 4A, the interface controlling mechanism 13 comprises a receiving selection circuit 131 and a failure detector 132.

The receiving selection circuit 131 receives frames via a channel 17 and transmits received frames to the receiver 123 via the channel 15. The receiving selection circuit 131 does not receive frames via the channel 17 in case of receiving an instruction from the failure detector 132.

The failure detector 132 includes a sent-frame number specifying circuit 133 and a received-frame number specifying circuit 134. When a failure occurs on the network unit 40 and frame transmission via the network 40 is suspended, for example, in a predetermined period, the sent-frame number specifying circuit 133 and the received-frame number specifying circuit 134 specifies the number of frames not transmitted in a transmitting data packet from a FLEN field of a header shown in FIG. 3C.

Figure 4B:
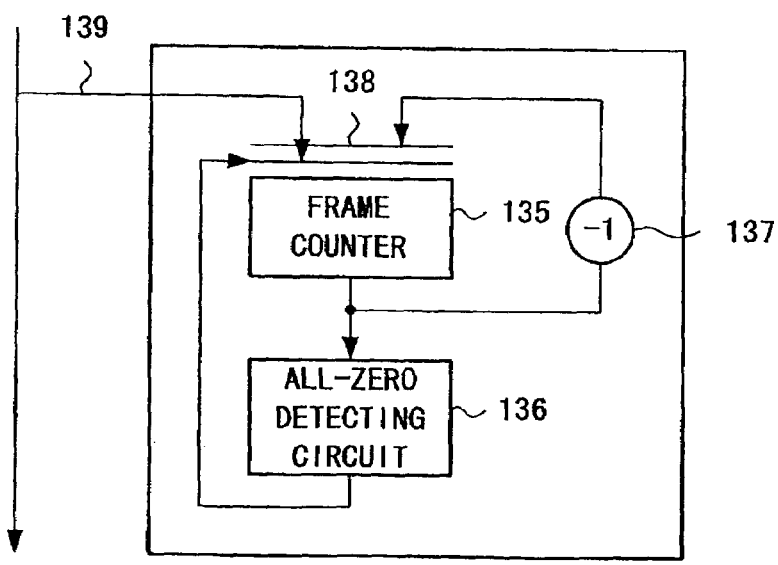
FIG. 4B is a diagram showing an example of a structure adopted to a sent-frame number specifying circuit shown in FIG. 4A.

Here, operations of the sent-frame number specifying circuit 133 and the received-frame number specifying circuit 134 will be explained referring to FIG. 4B in detail. FIG. 4B illustrates an example of the structure of the above-mentioned circuits. In this example, the above-mentioned circuits included a frame counter 135, an all-zero detecting circuit 136, a decrement circuit 137 and a selection circuit 138. A channel 139 is, for example, connected to the channel 17.

When detecting a header, which is included in a data packet, passing through the channel 139, the selection circuit 138 set the value that the FLEN field of the header represents, to the frame counter 135. For example, in case of where the data packet includes 3 frames, the FLEN field represents "2" as explained above. The frame counter 135 is set the value "2" in this case. The all-zero detecting circuit detects this value as default.

Next, when the second frame of the data packet passes through the channel 139, the decrement circuit 137 decrements the frame counter 135 by one. The all-zero detecting circuit 136 detects this new value.

Finally, the third frame (the last frame of the data packet) passes through the channel 139, the decrement circuit 137 decrements the frame counter 135 by one. The all-zero detecting circuit 136 detects that the counter's turns to be zero. By detecting that the counter's value reaches "0" from "2", the all-zero detecting circuit 136 can specify that all of the frames included in the data packet has been transmitted.

As explained above, the all-zero detecting circuit 136 can specify the number of transmitted-frames by detecting the counter's value. The all-zero detecting circuit 136 can also specify the number of frames not transmitted, and a break between a data packet and a next data packet. These circuits shown in FIG. 4B are applied to the multi-casting circuit 121 for specifying a break between a data packet and a next data packet.

The failure detector 132 having the above-described circuits specifies a source of a data packet from the SRC field of the header included the packet, when frame transmission is suspended in a predetermined period. The failure detector 132 then generates a packet (error notification packet) comprising a frame for notifying the source of the data packet that an error of the frame transmission occurs, and sends it to the receiving selection circuit 131 via an error notification path 140. The error notification packet has a SRC field of a header as a DAT field, and a DAT field of the header as a SRC field.

The failure detector 132 generates dummy frames corresponding to frames not transmitted due to a network unit failure and sends the generated dummy frames to the receiving selection circuit 131. The number of the dummy frames corresponds to the number of frames not transmitted. These dummy frames are for specifying a condition that at least of a connection between the interface controlling mechanism 13 and the transmission controlling mechanism 12 has no failure.

In case of receiving frames via the channel 17 after deciding that frame transmission is suspended, the failure detector 132 instructs the receiving selection circuit 131 not to receive the frames nor to transmit the frames to the receiver 123 by sending a reception-suspend signal via a signal path 141. The failure detector 132 let the receiving selection circuit 131 to restart to receive/transmit frames when receiving the first/second instruction packet.

Next, the structure of the I/O units 20, 21 shown in. FIG. 1 will be explained. The I/O unit 21 has the same structure as that of the I/O unit 20, only the structure of the I/O unit 20 will be explained here. As same as the central processing unit 10, the I/O unit 20 comprises a transmission controlling mechanism 22 and interface controlling mechanisms 23, 24.

Figure 5:
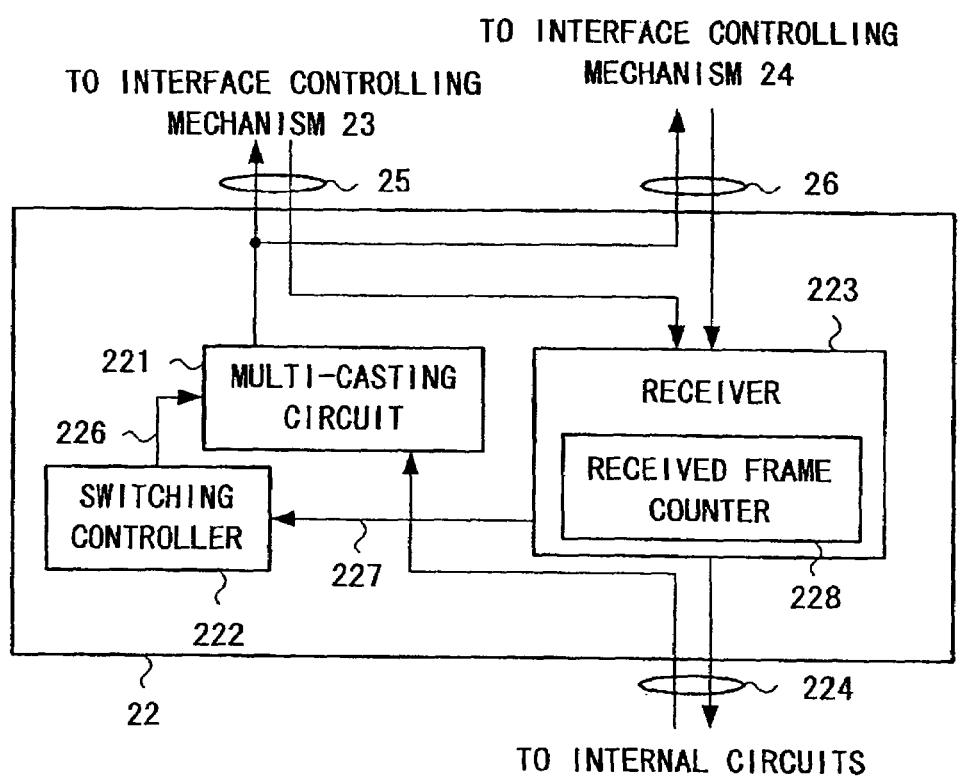
FIG. 5 is a block diagram showing a structure of a transmission controlling mechanism included in an input/output unit shown in FIG. 1.

As shown in FIG. 5, the transmission controlling mechanism 22 includes a multi-casting circuit 221, a switching controller 222 and a receiver 223.

The multi-casting circuit 221 is connected to the switching controller 222 via a control path 226. The multi-casting circuit 221 has the same function as the multi-casting circuit 121 shown in FIG. 2, and operates in accordance with an instruction from the switching controller 222.

The switching controller 222 shown in FIG. 5 is not connected to the system-monitoring unit 30 such as the switching controller 122 shown in FIG. 2. The switching controller 222 receives the first instruction packet or the second instruction packet sent from the central processing unit 10 via the receiver 223. The switching controller 222 generates acknowledgement packets corresponding to these first/second instruction packets, and sends the generated acknowledgement packets to the multi-casting circuit 221. Besides, when receiving the first instruction packet, the switching controller 222 instructs the multi-casting circuit 221 to transmit data to both the interface controlling mechanism 23 and the interface controlling mechanism 24 via a channel 25 and the channel 26 respectively. Or, when receiving the second instruction packet, the switching controller 222 instructs the multi-casting circuit 221 to transmit data to either of the interface controlling mechanism 23 or the interface controlling mechanism 24.

When receiving a notification from the receiver 223 that either of the network units has a failure, the switching controller 222 generates a packet for notifying the network unit failure to the system-monitoring unit 30. And the switching controller 222 sends the generated packet to the multi-casting circuit 221 and instructs the multi-casting circuit 221 to send the packet via a network that does not have a failure. Hereinafter, this packet is generally called as failure notification packet.

The receiver 223 has the same function as the receiver 123 shown in FIG. 2.

Figure 6:
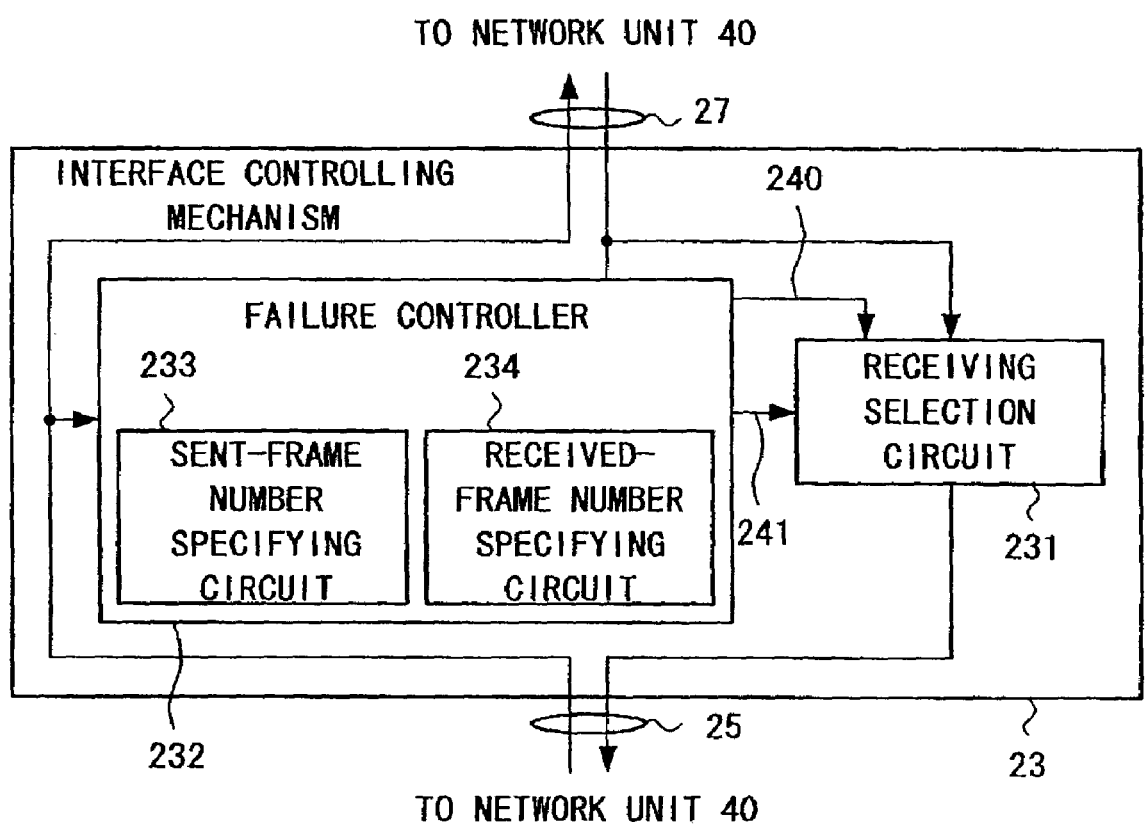
FIG. 6 is a block diagram showing a structure of an interface controlling mechanism included in the input/output unit shown in FIG. 1.

The interface controlling mechanism 23 has the same structure as the interface controlling mechanism 24. The interface controlling mechanism 23 has the same function as the interface controlling mechanism 13 shown in FIG. 4A. And, as shown in FIG. 6, the interface controlling mechanism 23 comprises a receiving selection circuit 231 and a failure detector 232. The failure detector 232 includes a sent-frame number specifying circuit 233 and a received-frame number specifying circuit 234 as same as the failure detector 132.

Figure 7:
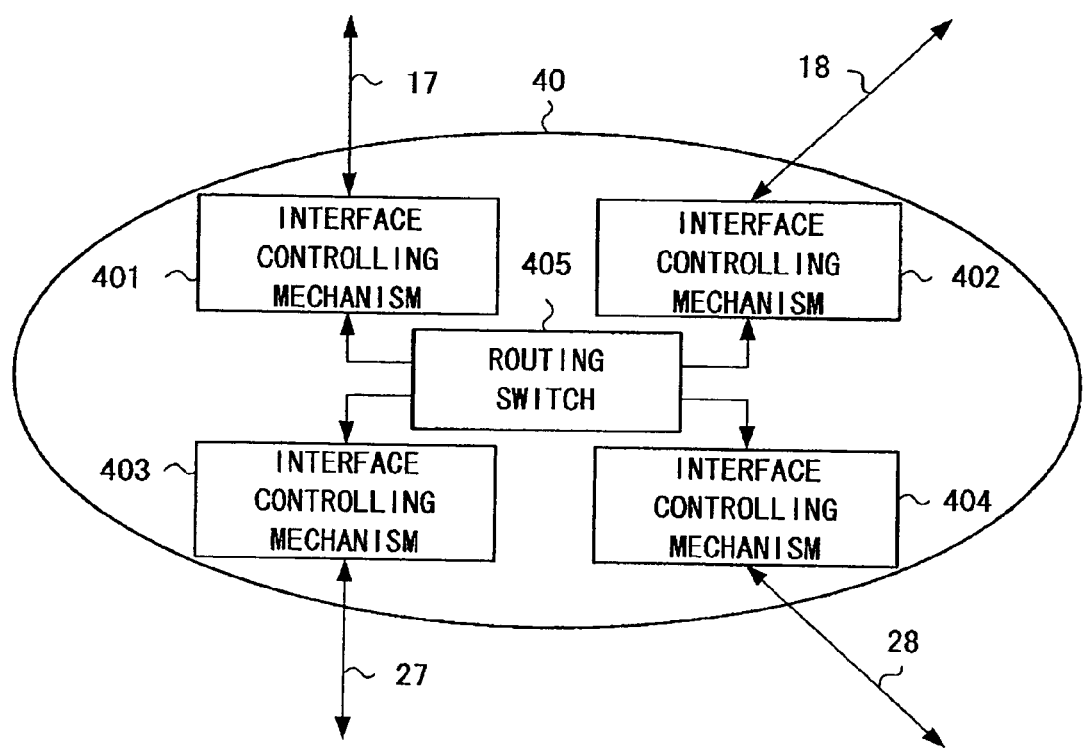
FIG. 7 is a block diagram showing a structure of a transmission controlling mechanism included in the input/output unit shown in FIG. 1.

Next, the structure of the network units 40, 41 shown in FIG. 1 will be explained with referring to FIG. 7. The structure of the network unit 41 is the same as that of the network unit 40. As shown in FIG. 7, the network unit 40 comprises interface controlling mechanisms 401, 402, 403, 404 and a routing switch 405.

The interface controlling mechanisms 401 to 404 have the same structures and functions as that of the interface controlling mechanism 13 shown in FIG. 4A. Each of the interface controlling mechanisms 401 to 404 is connected to the routing switch 405 with "point-to-point" connecting method.

The routing switch 405 comprises circuits shown in FIG. 4B and a memory (not shown) for storing a routing table, and performs routing data packets.

Next, operations of the computer system 1 having the above-described structure will be explained below. The operations of the computer system 1 will be explained in the following order:

1. Data transmitting operation simultaneously using two of the network units 40, 41 (first operation);
2. Operating condition switching operation from the first operation condition to an operating condition for frame transmission using either the network unit 40 or the network unit 41 in a case where a failure occurs on one of the network units (second operation);
3. Data transmitting operation using the network units which does not have a failure (third operation); and
4. Operating condition switching operation from the second operation condition to an operating condition for frame transmission simultaneously using two of the network units in a case where the defective network unit is recovered from a failure (fourth operation).

(First Operation)

Figure 8:
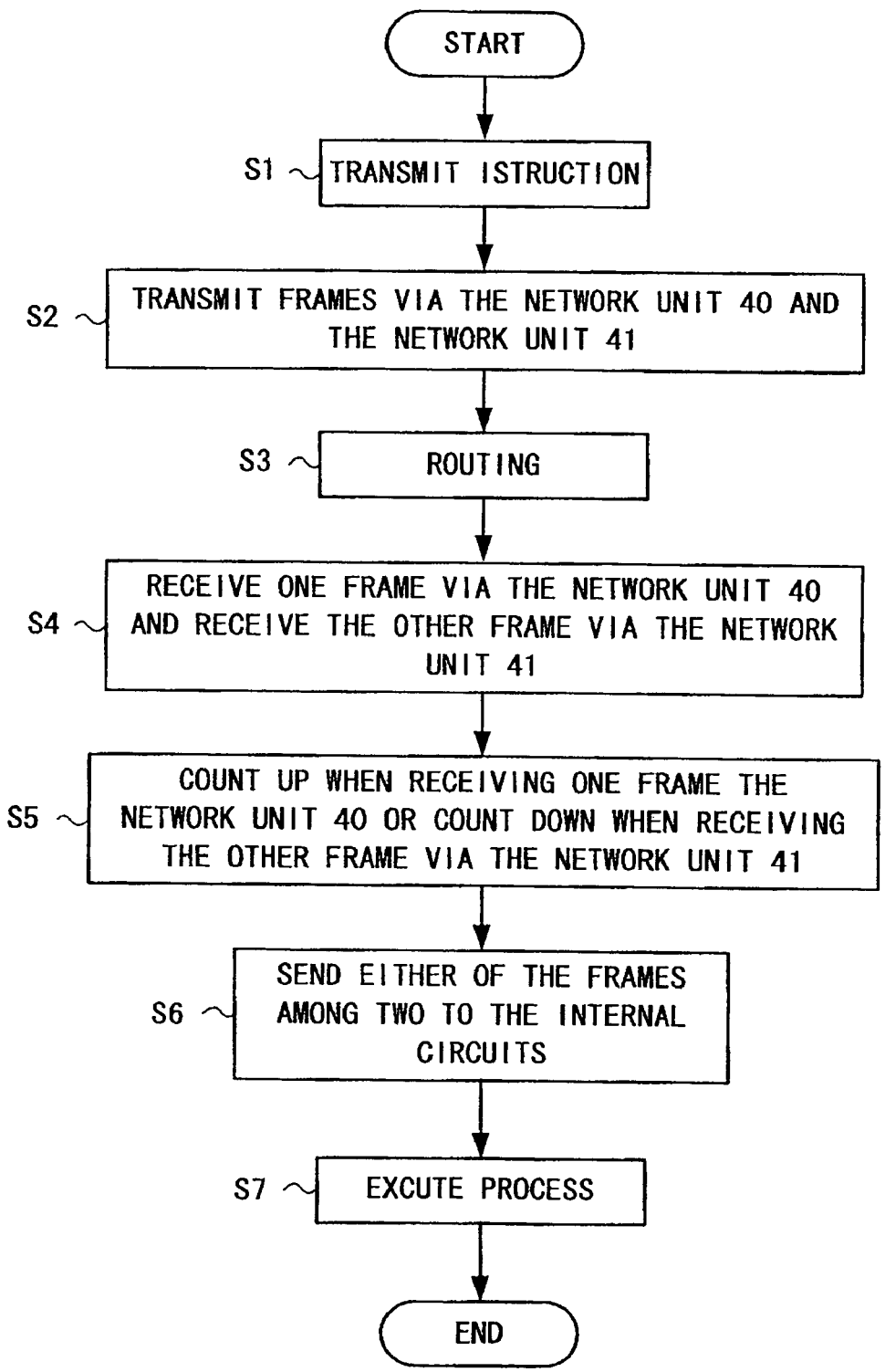
FIG. 8 is a flowchart for explaining a first operation of the computer system according to the embodiment of the present invention.

To begin with, referring to FIGS. 8 and 9, a description will be given of the first operation in a case where the central processing unit 10 sends a data packet in frame to the I/O unit 20. The operation explained below is essentially the same as the operation in the case where the central processing unit 10 sends a data packet to the I/O unit 21. It is also essentially the same as the operation in the case where the central processing unit 11 sends a data packet to the I/O unit 21, or the central processing unit 11 sends a data packet to the I/O unit 20.

When the administrator of the computer system 1 gives an instruction, to execute frame transmission simultaneously using both the network unit 40 and the network unit 41, from the system-monitoring unit 30, this instruction is notified to the switching controller 122 shown in FIG. 2 via the system-monitoring path 31. This instruction is then transmitted to the multi-casting circuit 121 (step S1).

Next, a data packet is sent from the internal circuit 10 of the central processing unit 10, that executed a predetermined process, to the multi-casting circuit 121 in frame.

The multi-casting circuit 121 receives the data packet in frame. In accordance with the instruction from the switching controller 122, the multi-casting circuit 121 sends the received data packet to both the interface controlling mechanism 13 and the interface controlling mechanism 14 via the channel 15 and the channel 16 in frame (step S2).

The interface controlling mechanism 13 receives the data packet in frame from the multi-casting circuit 121. The interface controlling mechanism 13 sends the received data packet in frame to the interface controlling mechanism 401 shown in FIG. 7.

The interface controlling mechanism 401 receives the data packet, and sends the received data packet to the routing switch 405.

The routing switch 405 receives the data packet. Then, The routing switch 405 specifies the destination address by reading the header of the received data packet. The routing switch 405 reads out the routing table from the memory (not shown), and specifies an interface controlling mechanism subject to send the data packet among the interface controlling mechanisms 401 to 404. The routing switch 405 sends the data packet to the specified interface controlling mechanism (in this example, the interface controlling mechanism 403) in frame (step S3).

The interface controlling mechanism 404 receives the data packet, and sends the received data packet to the interface controlling mechanism 23 of the I/O unit 20 via the channel 27.

The interface controlling mechanism 23 receives the data packet, and sends it to the transmission controlling mechanism 22 via the channel 25.

In the similar manner, the data packet sent to the interface controlling mechanism 14 from the multi-casting circuit 121 is transmitted to the transmission controlling mechanism 22 via the network unit 41 and the interface controlling mechanism 24, etc.

In the transmission controlling mechanism 22, the receiver 223 shown in FIG. 5 receives one data packet in frame via the channel 25 and the other data packet having the same contents as one data packet via the channel 26 in frame (step S4). The received-frame counter 228 is incremented when the receiver 223 receives one frame via the channel 25, and decremented when the receiver 223 receives the other frame via the channel 26 (step S5). Since sending the same frames to the internal circuits in duplex is not necessary, the receiver 223 sends one of the frames among two, and deletes the other (step S6). The internal circuits receive the data packet in frame, and execute a predetermined process based on the received data packet (step S7).

Here, the operation of sending one of the frames and deleting the other will be explained. Because of the difference between the loading condition of the network unit 40 and that of the network unit 41, a delay occurs thus the receiver 223 rarely receives one of the frames via the channel 25 and the other of the frames via the channel 26 at the same timing. The receiver 223 sends the first-transmitted frame to the internal circuits and deletes the other frame (having the same contents as the first-transmitted frame).

Figure 9:
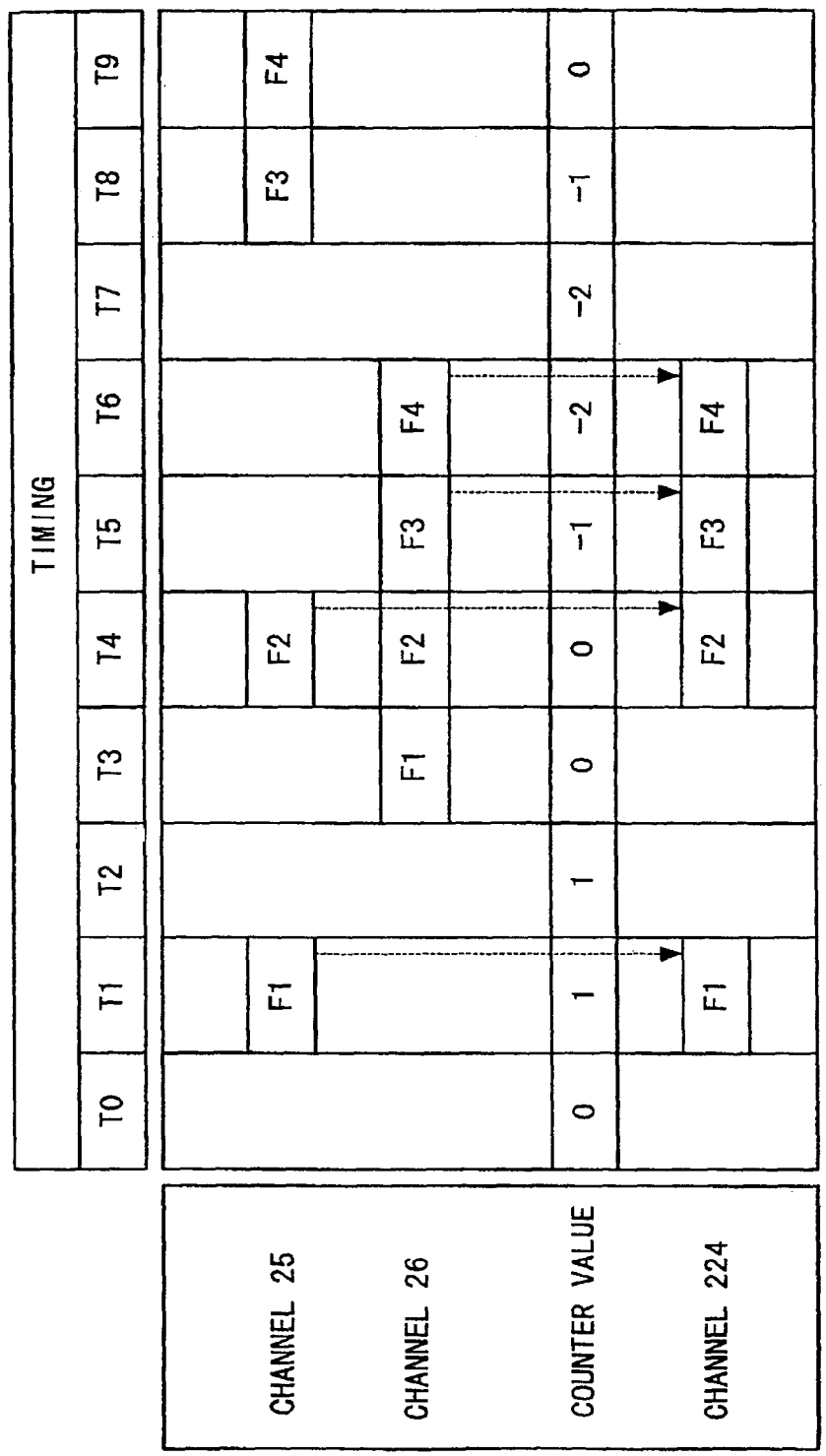
FIG. 9 is a diagram for explaining operations of a receiver and a received-frame counter both shown in FIG. 5.

Referring to FIG. 9, the operations of the receiver 223 and the received-frame counter 228 will be explained in detail. In this example, the data packet transmitted from the central processing unit 10 to the I/O unit 20 is assumed to include four frames F1 to F4. and the initial counters value is assumed as zero.

The receiver 223 receives one of the frames F1 via the channel 25 (timing T1). The received-frame counter 228 increments the counter's value by one since the receiver 223 receives one of the frames F1 via the channel 25. The receiver 223 sends the received frame F1 to the internal circuits.

While the receiver 223 not receiving frames, the received-frame counter 228 holds the counter's value unchanged (timing T2).

The receiver 223 receives the other frame F1 via the channel 26 (timing T3). The received-frame counter 228 decrements the counter's value by one since the receiver 223 receives the other frame F1 via the channel 26. By specifying a change in the counter's value turning to be "0", the receiver 223 determines that the frame transmission via the network unit 40 and the network 41 is carried out in normal condition since one of the frames F1 is transmitted via the channel 25 and the other of the frames F1 is also transmitted via the channel 26. Since the receiver has already received one of the frames F1, the receiver does not send the other frames F1 received at the timing T3.

The receiver 223 receives one of the frames F2 and the other of the frames F2 via the channel 25 and the channel 26 respectively, at the same timing (timing T4). The frame counter 228 is incremented and simultaneously decremented. As a result, no change happens on the counter's value. In this case, the receiver 223 sends either of the frames F2 among two, based on the predetermined priority. For instance, the receiver 223 sends one of the frames F2 transmitted via the channel 25 to the internal circuits.

The receiver 223 receives one of the frames F3 via the channel 26 (timing T5). The received-frame counter 228 is decremented. The receiver 223 sends the received frame F3 to the internal circuits.

The receiver 223 receives one of the frames F4 via the channel 26 (timing T6). The received-frame counter 228 decremented. The receiver 223 sends the received frame F4 to the internal circuits.

While the receiver 223 not receiving frames, the received-frame counter 228 keeps the counter's value unchanged (timing T7).

The receiver 223 receives the other frame F3 via the channel 25 (timing T8). The received-frame counter 228 is incremented. Since the receiver 223 has already received one of the frames F3, the receiver 223 does not send the other frame F3 received at timing T8.

The receiver 223 receives the other frame F4 via the channel 25 (timing T9). The received-frame counter 228 is incremented. The counter's value turns to be "0" as a result. Since the receiver 223 has already sent one of the frames F4, the receiver 223 does not send the other frame F4 received at timing T9 to the internal circuits. By specifying a change in the counter's value turning to be the initial value, that is, "0", the receiver 223 determines that the frame transmission via the network unit 40 and the network 41 is carried out in normal condition.

(Second Operation)

Figure 10:
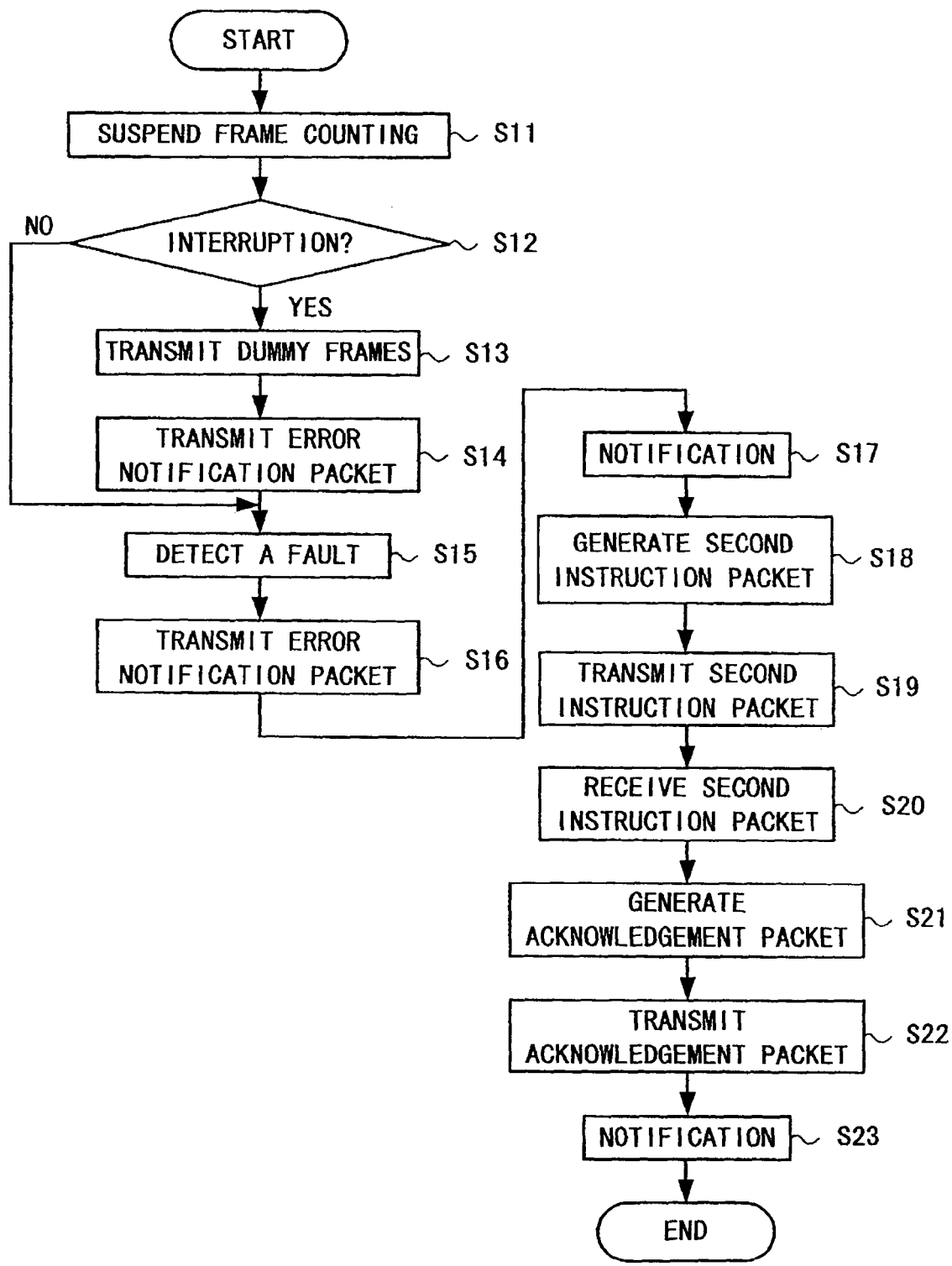
FIG. 10 is a flowchart for explaining a second operation of the computer system.

The second operation will be explained with referring to FIG. 10. The detail of the second operation will be explained by employing a case where a failure occurs on the network unit 40 while the central processing unit 10 sending a data packet to the I/O unit as described above, is executed.

A failure occurs on the network 40 and frame transmission is suspended. In the interface controlling mechanism 23 shown in FIG. 6, the receiving selection circuit 231 does not count the number of frames sent from the network unit 40 for a predetermined period (step S11) due to a failure occurred on the network unit 40. By means of this, the failure detector 232 detects a failure, and determines whether frame transmission is interrupted or not, in another words, whether all of the frames of a data packet sent from the network unit 40 are transmitted or not (step S12). When determining that all of the frames of the data packet are transmitted (step S 12: NO), the flow will go to the step S15. Or, when determining that some of the frames are not received (step S12: YES), the failure detector 232 generates the dummy frames. The number of the dummy frames generated corresponds to that of the frames not received. The failure detector 232 sends the generated dummy frames to the transmission controlling mechanism 22 by the receiving selection circuit 231 (step S13).

Also, the failure detector 232 reads out the header of the data packet, and generates the error notification packet from the read-out header, and sends the generated error notification packet to the transmission controlling mechanism 22 by the receiving selection circuit 231 (step S14).

Further, the failure detector 232 sends the reception-suspend signal to the receiving selection circuit 231, and instructs the receiving selection circuit 231 to suspend to receive frames.

In the transmission controlling mechanism 22, the receiver 223 shown in FIG. 5 receives the dummy frames and the error notification packet via the channel 25. By means of this, the receiver 223 detects that a failure occurs on the network 40 (step S15). And the receiver 223 specifies that there is no failure on at least the connection between the interface controlling mechanism 23 and the transmission controlling mechanism 22. The receiver 223 notifies the switching controller 222 that the network 40 has a failure and the frame transmission via the network is suspended.

However, the receiver 223 may not receive the dummy frame and the error notification packet in occasion because the channel 25 also has a failure, etc. In this occasion, the received-frame counter 228 overflows and the counter's value turns to be a negative value because the receiver 223 only receives the data packet from the interface controlling mechanism 24. The receiver 223 detects the overflow of the counter's value and a failure occurred on the network unit 40. Then, the receiver 223 notifies a failure of the network 40 to the switching controller 40.

The counter's value turns to be a negative value even the receiver 223 receives the dummy frames and the error notification packet in any case thus the switching controller 223 can detects a failure of the network unit 40.

In response to this notification, the switching controller 222 generates the failure notification packet for notifying the system-monitoring unit 30 that the network 40 has a failure, and sends the generated failure notification packet to the multi-casting circuit 221 via the control path 226. Besides, the switching controller 222 instructs the multi-casting circuit 221 to send the error notification packet via the network 41.

The multi-casting circuit 221 receives the error notification packet. In accordance with the instruction from the switching controller 222, the multi-casting circuit 221 sends the received error notification packet to the interface controlling mechanism 24 via the channel 26 (step S16).

The error notification packet sent to the interface controlling mechanism 24 is then transmitted to the transmission controlling mechanism 12 shown in FIG. 2 by the network unit 41, the interface controlling mechanism 14, and so on.

In the transmission controlling mechanism 12, the receiver 123 receives the error notification packet. The receiver 123 sends the received error notification packet to the switching controller 122 via the notification path 127.

The switching controller 122 receives the error notification packet, and notifies a failure of the network unit 40 to the system-monitoring unit 30, based on the contents of the received error notification packet (step S17).

In response to this notification, the system-monitoring unit 30 instructs the switching controller 122 to perform frame transmission via the network unit 41. This instruction is also transmitted to the switching controller (not shown) of the central processing unit 11.

In response to this instruction from the system-monitoring unit 30, the switching controller 122 generates the second instruction packet (step S18). Then, the switching controller 122 sends the generated second instruction packet to the multi-casting circuit 121 via the control path 126. The switching controller 122 instructs the multi-casting circuit 121 to send data only with the channel 16.

The multi-casting circuit 121 receives the second instruction packet. In response to the instruction from the switching controller 122, the multi-casting circuit 121 sends the received second instruction packet to the interface controlling mechanism 14 via the channel 16 (step S19).

In case of receiving the second instruction packet while receiving data packets from the internal circuits, the multi-casting circuit 121 sends the second instruction packet to the interface controlling mechanism 14 as an interruption process.

The second instruction packet sent to the interface controlling mechanism 14 is then transmitted to the interface controlling mechanism 24 by the network unit 41, etc. and further transmitted to the transmission controlling mechanism 22 shown in FIG. 5.

In the transmission controlling mechanism 22, the receiver 223 receives the second instruction packet. The receiver 223 sends the received second instruction packet to the switching controller 222 via the notification path 227. When receiving the second instruction packet (step S20), the switching controller 222 generates the acknowledgement packet corresponding to the received second instruction packet (S21), and sends the generated acknowledgement packet to the multi-casting circuit 221 via the control path 226. The switching controller 222 also instructs the multi-casting circuit 221 to sends data via the channel 26.

The multi-casting circuit 221 receives the acknowledgement packet. In response to the instruction from the switching controller 222, the multi-casting circuit 221 sends the received acknowledgement packet to the interface controlling mechanism 24 via the channel 26 (step S22).

In case of receiving the acknowledgement packet while receiving data packets from the internal circuits, the multi-casting circuit 221 sends the acknowledgement packet to the interface controlling mechanism 24 as an interruption process.

The acknowledgement packet sent to the interface controlling mechanism 24 is transmitted to the interface controlling mechanism 14 by the network unit 41, etc. and further transmitted to the transmission controlling mechanism 22 shown in FIG. 2.

In the transmission controlling mechanism 12, the receiver 123 receives the acknowledgement packet, and sends it to the switching controller 122 via the notification path 127.

The network controlling unit 122 receives the acknowledgement packet. The network controlling unit 122 notifies the system-monitoring unit 30 that the second instruction packet has been sent to the I/O unit 20 (step S23).

(Third Operation)

Figure 11:
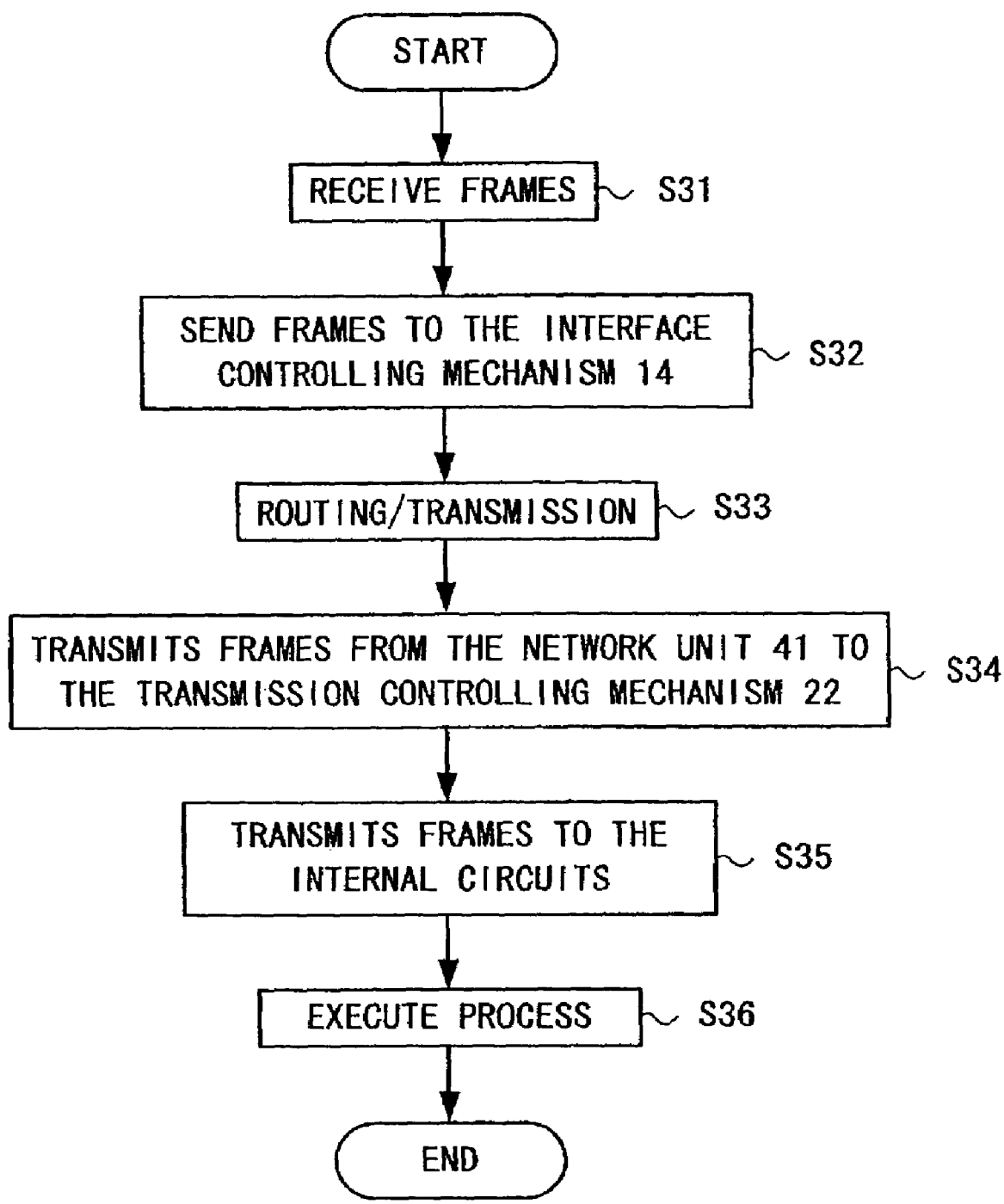
FIG. 11 is a flowchart for explaining a third operation of the computer system.

The third operation will be explained with referring to FIG. 11. The third operation is continuing from the second operation explained above.

The internal circuits of the central processing unit 10 execute a predetermined process, generate a data packet and send the generated data packet to the multi-casting circuit 121 in frame.

The multi-casting circuit 121 receives the data packet in frame (step S31). In response to the instruction from the switching controller 122, which is explained above, the multi-casting circuit 121 sends the received data packet to the interface controlling mechanism 14 via the channel 16 (step S32).

The frames of the data packet are transmitted to the network unit 41 by the interface controlling mechanism 14. While transmitting the frames, the failure detector of the interface controlling mechanism 14 counts the number of the frames sent from the multi-casting circuit 121.

In the network unit 40, the routing switch 405, etc. perform the above-described operations, and transmit the data packet sent from the interface controlling mechanism 14 to the interface controlling mechanism 24 (step S33).

In the interface controlling mechanism 24, the data packet is transmitted via the receiving selection circuit to the transmission controlling mechanism 22 in frame (step S34). While transmitting the frames, the failure detector of the interface controlling mechanism 24 counts the number of the frames.

In the transmission controlling mechanism 22, the receiver 222 receives the transmitted data packet via the channel 26. The receiver 222 then sends the received data packet to the internal circuit via the channel 224 (step S35). While receiving the data packet in frame, the received-frame counter 228 overflows because the receiver 223 receives the frames only via the channel 26. Because this overflow is not due to a transmission error such as explained above, the receiver 223 does not notify a frame transmission error in this case.

The internal circuits receive the data packet from the switching mechanism 223, and execute a predetermined process (step S36).

(Fourth Operation)

Figure 12:
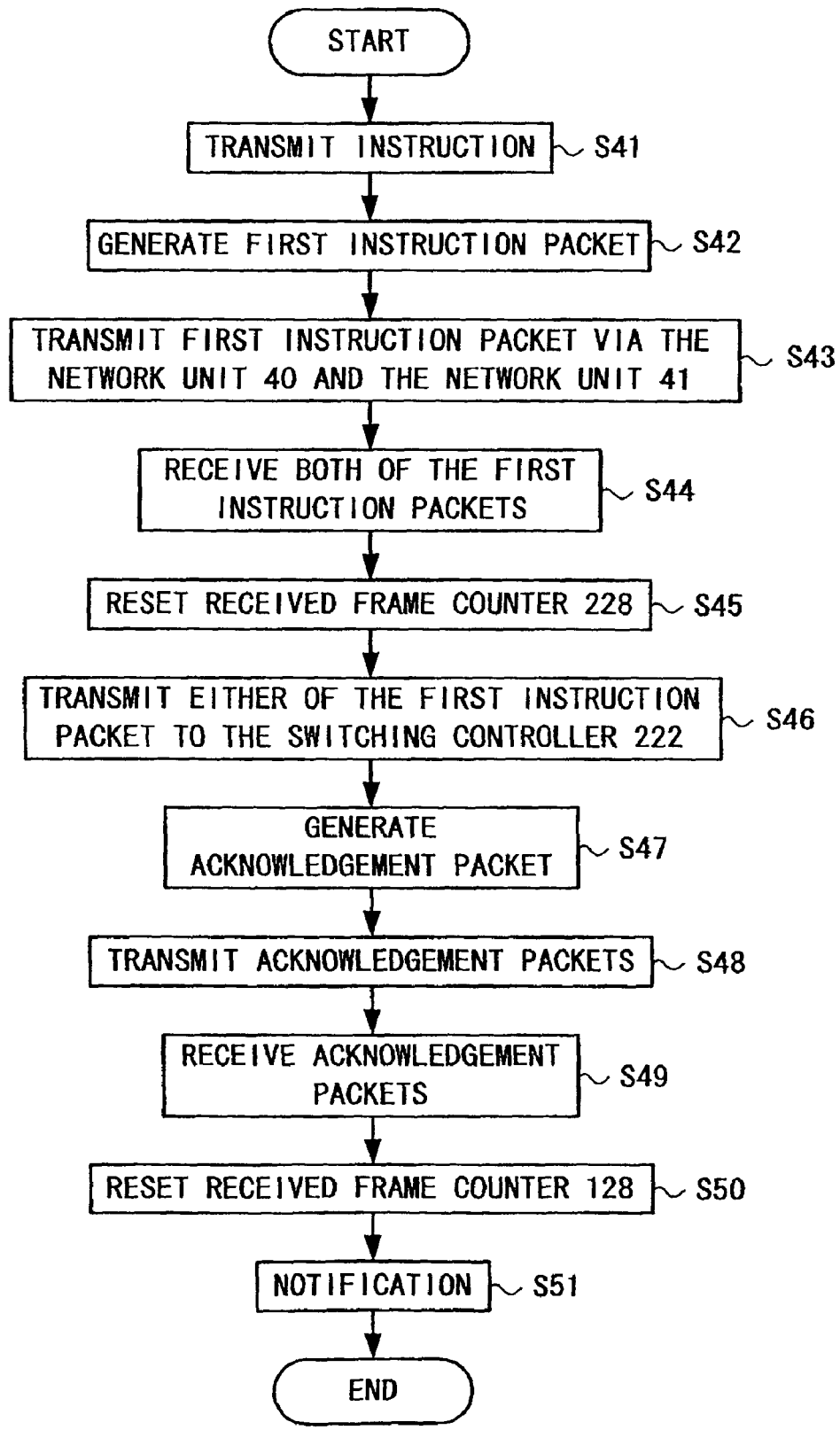
FIG. 12 is a flowchart for explaining a fourth operation of the computer system.

The fourth operation of the computer system 1 will be explained in detail with referring to the FIG. 12. The operations of the central processing unit and the I/O unit 20 are essentially the same as those of the central processing unit 11 and the I/O unit 21, the explanation will be only given to the operations of the central processing unit 10 and the I/O unit 20.

The administrator of the computer system 1 gets rid of a failure of the network unit 40. Then, the administrator gives an instruction to execute frame transmission using both the network unit 40 and the network unit 41 from the system-monitoring unit 30, this instruction is notified to the network controller 122 shown in FIG. 2 (step S41).

This instruction is also notified to the network controller of the central processing unit 11.

In response to this instruction, the switching controller 122 generates a packet (first instruction packet) (step S42). The switching controller 122 then sends the generated first instruction packet to the multi-casting circuit 121 via the control path 126. The switching controller 122 also instructs the multi-casting circuit 121 to send the first instruction packet to both the interface controlling mechanism 13 and the interface controlling mechanism 14.

The multi-casting circuit 121 receives the first instruction packet. In accordance with the instruction from the network controller 122, the multi-casting circuit 121 sends the received first instruction packet to both the interface controlling mechanism 13 and the interface controlling mechanism 14 (step S43).

In case of receiving the first instruction packet while receiving data packets from the internal circuits, the multi-casting circuit 121 sends the first instruction packet to the interface controlling mechanisms 13, 14 as an interruption process.

One of the first instruction packets sent to the interface controlling mechanism 13 and the other of the first instruction packets sent to the interface controlling mechanism 14 are both transmitted to the interface controlling mechanism 23 and the interface controlling mechanism 24 by the network unit 40 and the network unit 41, respectively. Both of the first instruction packets are further transmitted to the transmission controlling mechanism 22 shown in FIG. 5.

While one of the first instruction packets transmitted, in the interface controlling unit 13, when receiving one of the first instruction packets, the failure detector 132 instructs the receiving selection circuit 131 to forward any frames sent from the network unit 40 to the transmission controlling mechanism 12. In the interface controlling mechanism 23, when receiving one of the first instruction packets from the network 40, the failure detector 232 instructs the receiving selection circuit 231 to forward any frames sent from the network 40 to the transmission controlling mechanism 22.

In the transmission controlling mechanism 22, the counter's value has turned to be a negative value because the receiver 223 received frames only via the network 41. The receiver 223 receives one of the first instruction packets via the channel 25 and the other first instruction packet via the channel 26. When receiving both one of the first instruction packets and the other of the first instruction packets (step S44), the receiver 223 initializes the counter's value to the initial value (that is, "0" in this example) (step S45).

However, the receiver 223 does not receive one of the first instruction packets via the channel 25 and the other first instruction via the channel 26 at the same timing due to the difference between the load conditions of the network unit 40 and that of the network unit 41. The receiver 223 does not initialize the counter's value until receiving both one of the first instruction packets and the other of the first instruction packets.

The receiver 223 sends either of the first instruction packets among two to the switching controller 222 (step S46).

The switching controller 222 receives the first instruction packet. Then, the switching controller 222 generates the acknowledgement packet corresponding to the first instruction packet (Step S47), and sends it to the multi-casting circuit 221 via the control path 226. The switching controller 222 also instructs to the multi-casting circuit 221 to use both the interface controlling mechanism 23 and the interface controlling mechanism 24 when frame transmission is carried out.

The multi-casting circuit 221 receives the acknowledgement packet. In response to the instruction from the switching controller 222, the multi-casting circuit 221 sends the acknowledgement packet to both the interface controlling mechanism 23 and the interface controlling mechanism 24 (Step S48).

In case of receiving the acknowledgement packet while receiving data packets from the internal circuits, the multi-casting circuit 221 sends the acknowledgement packet to the interface controlling mechanisms 23, 24 as an interruption process.

One of the acknowledgement packets sent to the interface controlling mechanism 23 and the other of the acknowledgement packets sent to the interface controlling mechanism 24 are transmitted to the interface controlling mechanism 13 and the interface controlling mechanism 14, respectively. Both of the transmitted acknowledgement packets are further transmitted to the transmission controlling mechanism 12.

In the transmission controlling mechanism 12 shown in FIG. 2, the receiver 123 receives one of the acknowledgement packets via the channel 15 and the other of the acknowledgement packets via the channel 16 (step S49). The receiver 123 initializes the overflowed value of the received-frame counter 128 in the same way as the receiver 223 (step S50).

The receiver 123 sends either of the received acknowledgement packets among two to the switching controller 122. The switching controller receives the acknowledgement packet. The switching controller 122 then notifies that the I/O unit 20 receives the first instruction packet (step S51).

In response to this instruction, the system-monitoring unit 30, for example, displays a message representing the contents of the notification on the display unit.

The invention is not limited to the above-described embodiment, but can be applied in various way. For example, in the above-described embodiment, the computer system 1 comprises a pair of the central processing unit 10 and the I/O unit 20 and the other pair of the central processing unit 11 and the I/O units 21 as an example. However, the number of the pair that the computer system 1 has, is not limited to this example. The number of the pair of the central processing unit and the I/O unit is optional as long as the central processing unit and the I/O unit are connected together via two of data transmitting routes. The structure of the network unit may be designed in accordance with the number of the pair of the central processing unit and the I/O unit.

Figure 13:
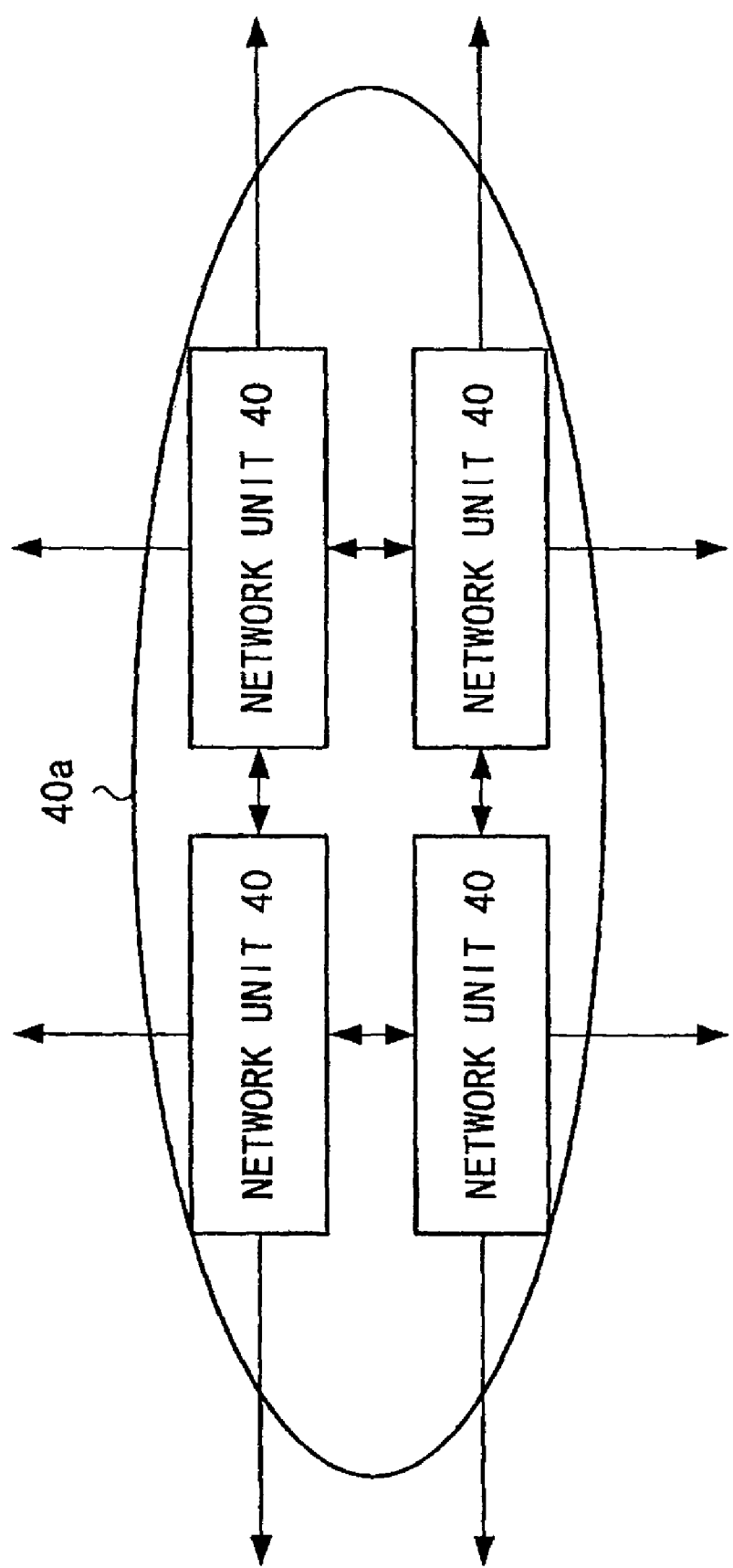
FIG. 13 is a block diagram showing another example of a structure of the network unit.

For example, in a case where the computer system 1 comprises four pairs of the central processing unit and the I/O unit, four network units 40 may be used to compose one network unit 40a as shown in FIG. 13.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2002-236345 filed on Aug. 14, 2002 and including specification, claims, drawings and summary. The disclosure of the above Japanese Patent Application is incorporated herein by reference in its entirety.

What is claimed is:

1. A computer system comprising:
at least one pair comprising a first processor connected to a first input/output unit, and a second processor connected to a second input/output unit, wherein the first processor is connected to the first input/output unit via two data transmitting routes and the second processor is connected to the second input/output unit via said two transmitting routes,
wherein said first or second processor sends a frame, which is included in data, to said first or second input/output unit, respectively via one of said two data transmitting routes and simultaneously sends the frame via another of said two data transmitting routes; and
wherein said first or second input/output unit sends a frame, which is included in data, to said first or second, processor, respectively via one of said two data transmitting routes and simultaneously sends the frame via another of said two data transmitting routes; and
said first or second input/output unit or said first or second processor receives the same frames via one of said two data transmitting routes and via the other of said data transmitting routes, and accepts either of the same frames based on the order in which said frames were received.

2. The computer system according to claim 1, wherein an input/output unit or a processor accepts one of same frames, whichever one is received first, and accepts either one of same frames, which are received at the same time.

3. The computer system according to claim 2, wherein each of said processors and each of said input/output units comprise a receiver for receiving the same frames via one of said data transmitting routes and the other of said data transmitting routes, and a counter which is incremented in a case where said receiver receives one of the same frames via one of said data transmitting routes and decremented in a case where said receiver receives the other of the same frames via the other of said data transmitting routes;

wherein:

said counter is only incremented or decremented thus overflowed to positive or negative because a failure occurs on either of said data transmitting routes and said receiver receives only one of the same frames via either of said two data transmitting routes; and said receiver is capable of specifying a data transmitting route having a failure by detecting that said counter overflows to positive or negative.

4. The computer system according to claim 3, at least one of said first and second processors further comprising:

a first multi-casting circuit for sending the same frames to the receiver included in said input/output unit and a first switching controller which is connected to a system-monitoring unit, operated by an administrator, and notified that a failure exists on either of said two data transmitting routes from said receiver, wherein said first switching controller instructs said first multi-casting circuit to carry out frame transmission only via the data transmitting route which does not have a failure.

5. The computer system according to claim 4, wherein at least one of said first and second input/output units further comprises a second multi-casting circuit for sending the same frames to said receiver included in said processor, and a second switching controller for notifying to said system-monitoring unit that a failure exists on either of said data transmitting routes, in case of receiving a notification of the failure from said receiver included in said input/output unit, by transmitting the notification to said receiver included in said processor.

6. The computer system according to claim 5, wherein:

said first multi-casting circuit sends the instruction, which was sent from said first switching controller, to said receiver included in said input/output unit via said data transmitting route not having the failure;

said receiver included in said input/output unit transmits the instruction to said second switching controller;

said second switching controller instructs said second multi-casting circuit to carry out frame transmission only via said data transmitting route not having the failure; and said second multi-cast circuit carries out frame transmission in accordance with the instruction from said second switching controller.

7. The computer system according to claim 6, wherein:

in a case where the failure is removed and the administrator gives an instruction from said system-monitoring unit to execute frame transmission using two of said data transmitting routes, said first switching controller receives the instruction from said system-monitoring unit and transmits the received instruction to said first multi-casting circuit;

said first multi-casting circuit sends the transmitted instruction to said receiver included in said input/output unit;

said receiver included in said input/output unit receives the instruction from said first multi-casting unit and notifies the received instruction to said second switching controller; and said second switching controller gives an instruction to said second multi-casting circuit based on the instruction which is notified from said receiver included in said input/output unit.

8. A frame transmitting method applied to a computer system comprising at least a pair of a processor and an input/output unit connected to each other via two data transmitting routes, said method comprising:

sending a frame which is included in data from said processor or said input/output unit to said input/output unit or said processor via one of said two data transmitting routes and simultaneously sending the frame via the other of said two data transmitting routes from said processor or said input/output unit to said input/output unit or said processor;

receiving two of the same frames, one frame via one of said two data transmitting routes and the other frame via the other of said two data transmitting routes by said input/output unit or said processor; and accepting either of the same frames based on the receiving order thereof.

9. The frame transmitting method according to claim 8, further comprising:

accepting either of the same frames which is received by said input/output unit or said processor faster than the other of the two same frames;

accepting either one of the same frames in a case where one of the two same frames and the other of the two same frames are received by said input/output unit or said processor at the same time.

10. The frame transmitting method according to claim 9, further comprising:

applying a counter to each of said processor and said input/output unit which is incremented in a case where said processor or said input/output unit receives one of the same frames via one of said two data transmitting routes and decremented in a case where said processor or said input/output unit receives the other of the same frames via the other of said two data transmitting routes; and specifying a failure occurring on either of said data transmitting routes by detecting that the counter overflows in a case where the failure occurs on either of said data transmitting routes and therein said processor or said input/output unit only receives either of the two same frames via a one of said two data transmitting route not having a failure.

* * * * *